United States Patent [19]

Kraft

[11] Patent Number: 5,682,301
[45] Date of Patent: Oct. 28, 1997

[54] MODULAR NETWORK CABLING SYSTEM FOR ENTERPRISE WITH MULTIPLE SITES

[76] Inventor: James L. Kraft, 4751 Fox La., Hellam, Pa. 17406

[21] Appl. No.: 645,728

[22] Filed: May 14, 1996

[51] Int. Cl.$^6$ .................................................. H02B 1/01
[52] U.S. Cl. ............................................ 361/826; 361/829
[58] Field of Search ................................. 361/601, 602, 361/826, 827, 829; 379/327; 439/189, 729; 174/60, 65 R, 50

[56] References Cited

U.S. PATENT DOCUMENTS

| | | | |
|---|---|---|---|
| 3,755,716 | 8/1973 | Yoshii et al. | 361/829 |
| 4,002,856 | 1/1977 | Sedlacek et al. | 379/327 |
| 4,037,910 | 7/1977 | Paluch | 439/189 |
| 4,117,273 | 9/1978 | Gautier et al. | 361/601 |
| 4,145,853 | 3/1979 | Bridwell | 174/48 |
| 4,158,754 | 6/1979 | Yonezaki et al. | 361/601 |
| 4,320,261 | 3/1982 | Scerbo et al. | 361/601 |
| 4,352,146 | 9/1982 | Hermanutz et al. | 361/827 |
| 4,390,755 | 6/1983 | Pierresteguy | 361/601 |
| 4,860,168 | 8/1989 | Wiljanen et al. | 361/829 |
| 4,964,020 | 10/1990 | Savage et al. | 379/829 |
| 5,078,613 | 1/1992 | Salmon | 439/92 |
| 5,422,946 | 6/1995 | Delakowitz et al. | 379/327 |
| 5,487,666 | 1/1996 | DiGiovanni | 434/72 |
| 5,521,973 | 5/1996 | Peng | 379/329 |
| 5,548,484 | 8/1996 | Reed et al. | 361/827 |

OTHER PUBLICATIONS

Siecor Corporation, Fiber Cabling Solutions for Premises Networks, Feb. 1996.

IES Technologies, FutureSmart Interactive Network, 1995.

*Primary Examiner*—Leo P. Picard
*Assistant Examiner*—Anthony Dinkins
*Attorney, Agent, or Firm*—Dann, Dorfman, Herrell and Skillman, P.C.

[57] ABSTRACT

A cabling system for an enterprise having multiple, remotely located work sites or branch offices is described. Each work site has a plurality of workstations that are interconnected in a computer and/or communication network and the cabling system includes a plurality of cabling kits that are prefabricated for installation. Each cabling kit includes a prefabricated equipment rack, at least one cable interconnection device mounted on the equipment rack for providing an interconnection to a centralized network or communication system device, a plurality of distribution outlets, each located at one of the workstations, and a plurality of multiconductor distribution cables formed in lengths dimensioned according to the physical layout of a work site for interconnecting the cable interconnection device and the distribution outlets. Except for the number and lengths of the multiconductor distribution cables, the cabling kits are configured identically for each of the work sites.

12 Claims, 5 Drawing Sheets

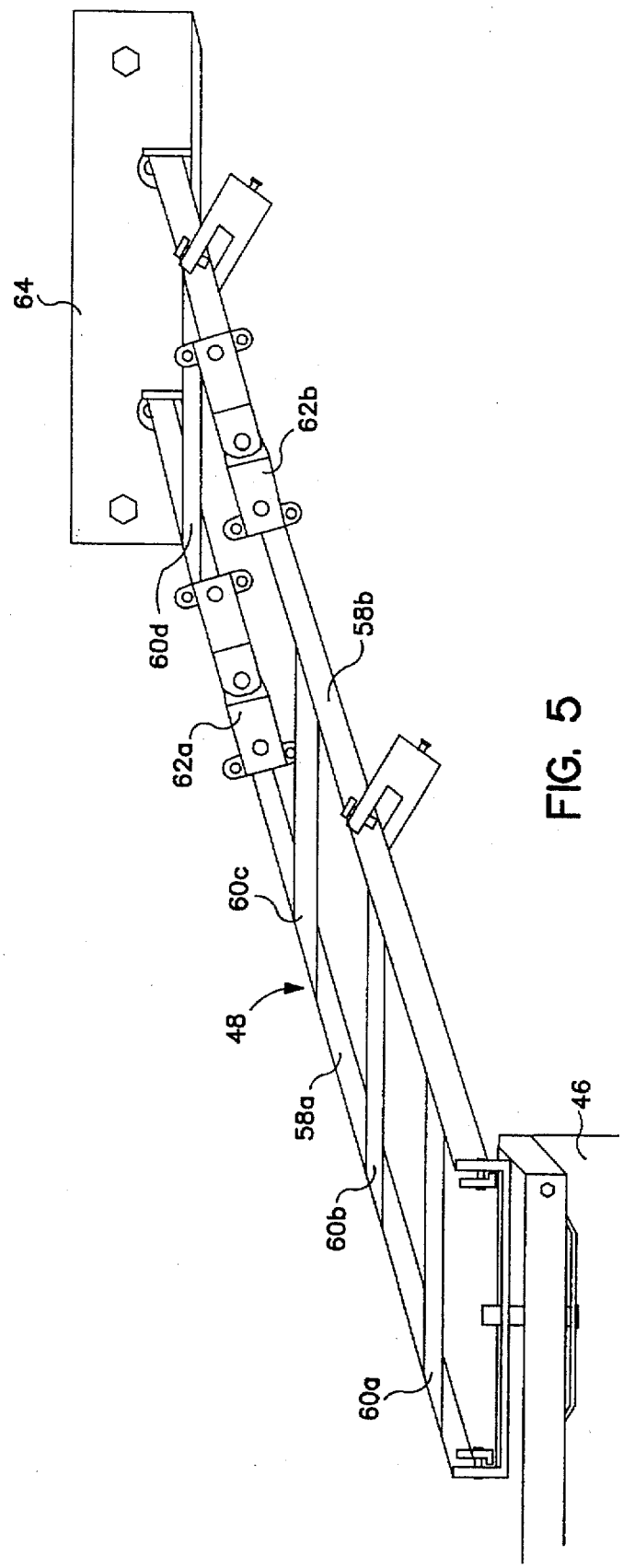

MODULAR NETWORK CABLING SYSTEM FOR ENTERPRISE WITH MULTIPLE SITES

FIELD OF THE INVENTION

This invention relates to local computer and communication networks and in particular to a modular cabling system for an enterprise having such networks at multiple work sites.

BACKGROUND OF THE INVENTION

The past few years have seen explosive growth in the use of in-house computer networks, sometimes referred to as local area networks (LAN). The growth in the use of such networks has resulted not only in an increased demand for computer and communications equipment, but also for network cabling systems. Although standards have been established for various types of computer equipment and network cabling components, there has been no standardization with respect to the assembly and installation of the network cabling systems.

Typically, a user will specify and purchase various items of computer, communication, and network hardware from one or more manufacturers and/or resellers. However, the user must contract with a separate installer to install, configure, and interconnect the equipment. Hitherto, the network cabling and cabling equipment has been assembled and installed on a site-by-site basis. Thus, for an enterprise having multiple work sites, the local computer and communication network cabling system at each work site is unique relative to the other work sites. The lack of standardized installation configurations often complicates simple changes when a workstation has to be moved or added at a work site or when there is a need to connect new equipment to the local area network or in trouble shooting a problem. Oftentimes the original installing technician is no longer available and the local manager at the work site has little or no knowledge of the configuration of the cabling system. A corporate system manager cannot readily assist the local manager over the phone because the system at the local site is configured differently from the site at which the system manager may be located and is familiar with. Consequently, the enterprise must incur an additional expense to have a local contract technician go out to the work site, familiarize himself with the work site's cabling system, and then make the necessary changes or fix the problem. Another undesirable alternative is that the corporate system manager must travel to the local site to make the necessary changes.

A further problem associated with the present network cabling system installations is that they are not readily transportable if the branch office has to move to a new location.

In view of the foregoing problems, it would be desirable to have a network cabling system that can be easily installed in multiple work sites by multiple vendors and yet be essentially the same from location to location. Such a system would provide the corporate communication system/data system manager with more effective control over the computer and communication systems at each of a plurality of remotely located work sites.

SUMMARY OF THE INVENTION

The problems associated with the known methods for installing cabling systems for computer and communication networks at a plurality of remotely located work sites of a single enterprise are solved to a large degree by a modular cabling system in accordance with the present invention. The present invention provides a cabling system for an enterprise having multiple work sites, each work site having a plurality of workstations that are interconnected in a network. The cabling system includes a plurality of cabling kits, each cabling kit being configured for one of said multiple work sites. Each of the cabling kits includes a prefabricated equipment rack, a cable interconnection device mounted on the equipment rack for providing an interconnection to a centralized network device, a plurality of cable outlets, each adapted for being located at one of the workstations, and a plurality of prefabricated multiconductor distribution cables formed in lengths dimensioned according to the physical layout of a work site for interconnecting the cable interconnection device and the cable outlets. Except for the number and lengths of the multiconductor distribution cables, the cabling kits are configured identically for each of the work sites.

BRIEF DESCRIPTION OF THE DRAWINGS

The foregoing summary as well as the following detailed description of a preferred embodiment of the present invention will be better understood when read in conjunction with the appended drawings, wherein:

FIG. 5 is an isometric view of a horizontal section of the equipment rack shown in FIG. 1.

DETAILED DESCRIPTION

Figure 1:
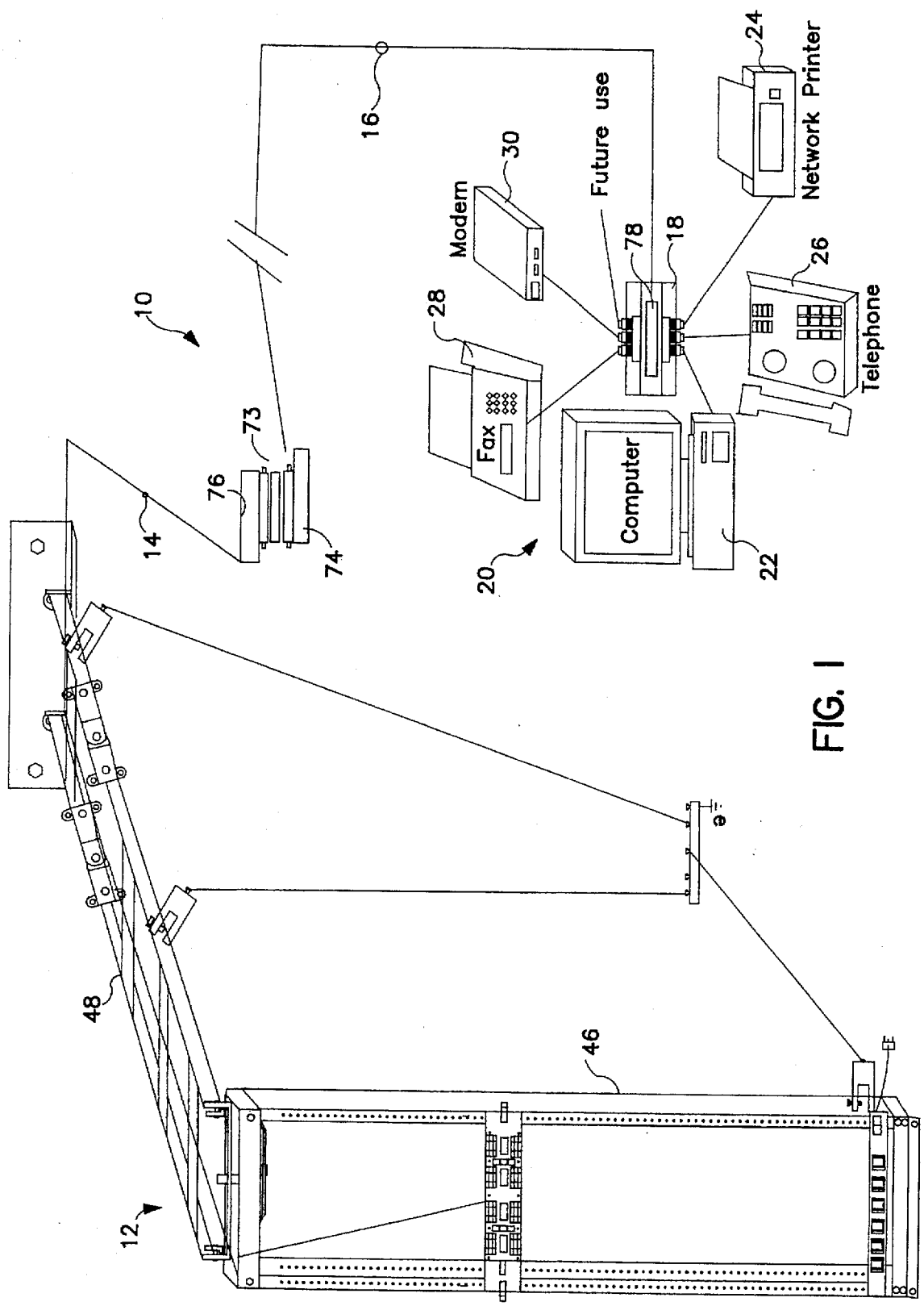
FIG. 1 is a schematic diagram of a basic cabling system according to the present invention.

Referring now to the drawings wherein like reference numerals refer to the same or similar components across the several views, and in particular to FIG. 1, there is shown a basic system configuration or kit for a modular cabling system in accordance with the present invention. The cabling system kit includes an equipment rack 12, a jumper cable 14, and distribution cable 16, and a distribution outlet 18. The distribution outlet 18 is located at an office workstation 20. The workstation 20 typically includes one or more pieces of data processing or communications equipment. In the embodiment shown in FIG. 1, workstation 20 includes a personal computer 22, a network printer 24, a telephone 26, fax machine 28, and a modem 30. Those skilled in the art will appreciate that the workstation 20 may include fewer items than those shown and described, or in some cases, may include additional pieces of equiment. The distribution outlet 18 has a plurality of jacks into which cables from the various pieces of equipment at workstation 20 are plugged.

Figure 2:
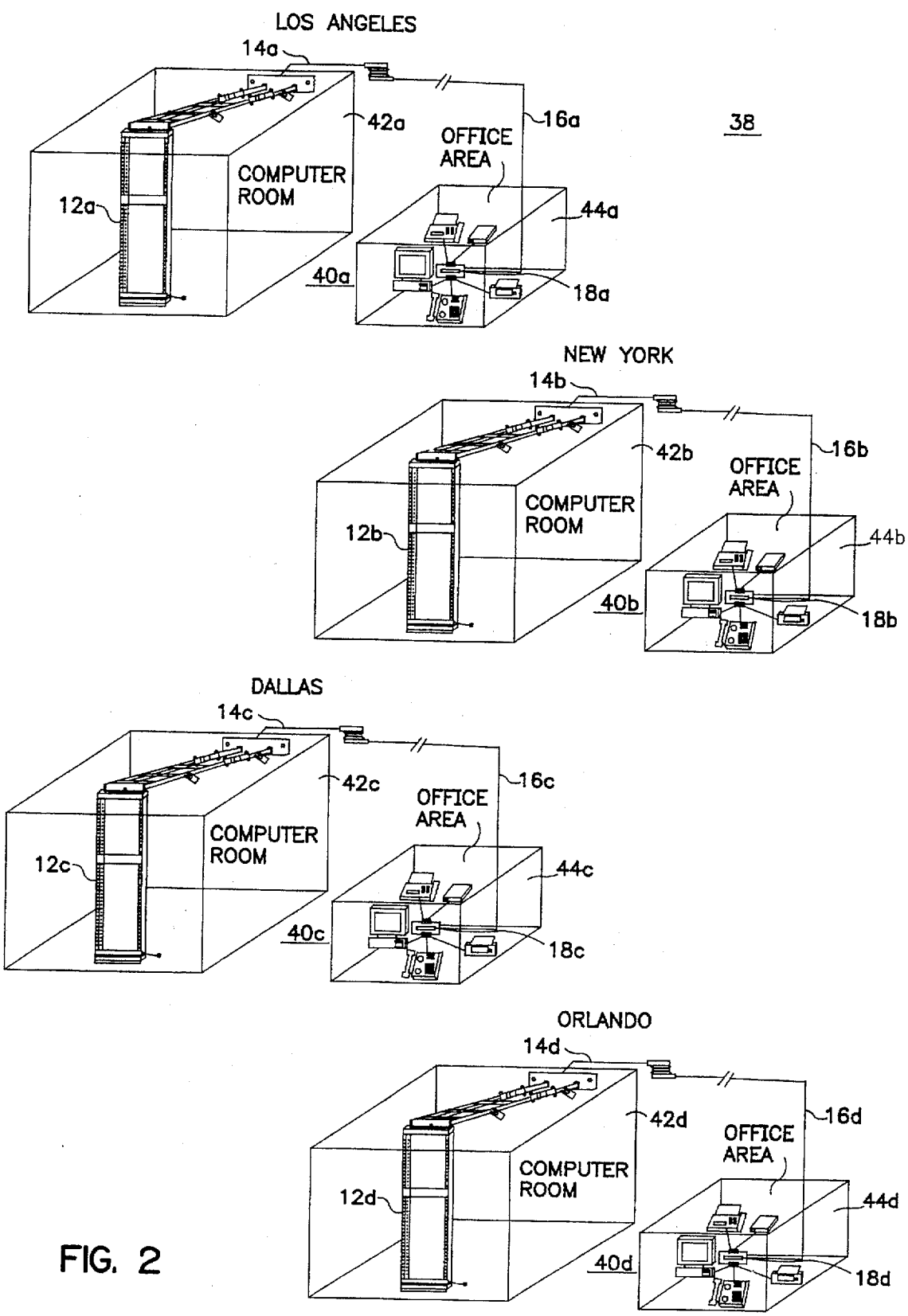
FIG. 2 is a schematic diagram of an enterprise having multiple, remotely located work sites, each utilizing a modular cabling system as shown in FIG. 1.

Referring now to FIG. 2, there is shown a typical enterprise arrangement 38 of the modular cabling system according to the present invention. The system includes a number of branch offices 40a, 40b, 40c, and 40d, located remotely from one another. The branch offices can be located in different cities as shown in the embodiment of FIG. 2, or can be located within the same city or region, as in the case of branch offices of a bank.

Each of the branch offices includes a computer room 42a, 42b, 42c, and 42d, within which the cabling system equipment racks 12a, 12b, 12c, and 12d, are respectively located. Multiconductor jumper cables 14a, 14b, 14c, and 14d interconnect the equipment racks with respective multiconductor distribution cables 16a, 16b, 16c, and 16d. The multiconductor distribution cables are routed from the respective computer rooms to the various workstations 44a, 44b, 44c, and 44d of the work site or branch office. Each workstation at the respective work site has a distribution outlet 18a, 18b, 18c, and 18d to which the various pieces of data processing and/or communication equipment are connected.

The cabling systems of each of the branch offices 40a, 40b, 40c, and 40d are configured essentially identically with respect to the equipment racks, jumper and distribution cables, and the distribution outlets. One difference between branch offices would be with respect to the lengths of the distribution cables because each branch office is likely to have a different physical layout from any of the other branch offices. Another difference would be in the number of workstations which must be served by the local cabling system, which is likely to be different from work site to work site.

Figure 3:
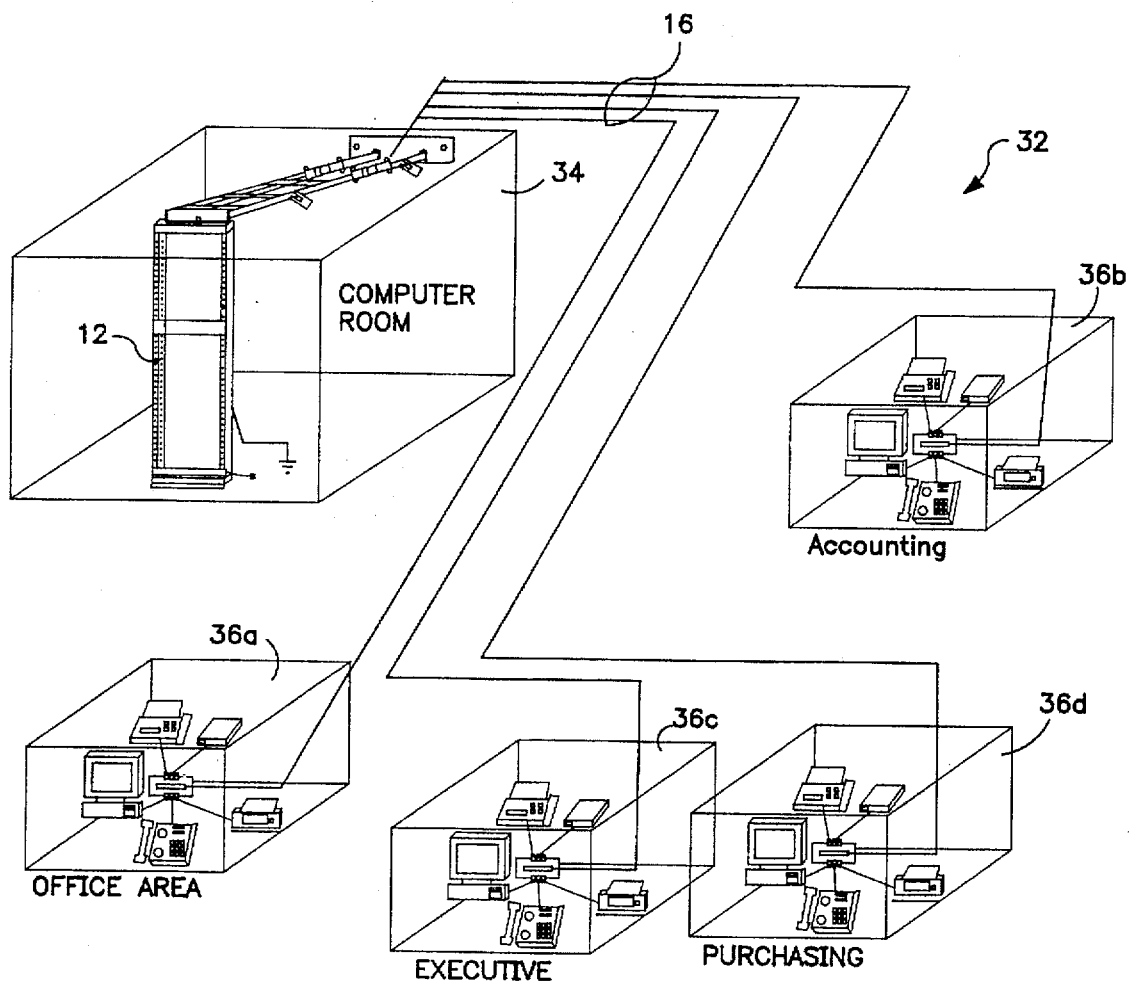
FIG. 3 is a schematic diagram of an installation of a cabling system according to this invention at a work site or branch office having a plurality of networked work stations.

Shown in FIG. 3 is a typical layout of a cabling system for a single branch office having multiple workstations. The equipment rack 12 is located in a computer room or closet 34. The multiconductor distribution cables 16 run from the computer room 34 to each of the plurality of workstations. The workstations are typically located in various office areas within the branch office. For example, in the branch office shown in FIG. 3 there are workstations located in a secretarial office area 36a, an accounting office area 36b, an executive office area 36c, and a purchasing office area 36d. All of the workstations are connected to a central local network. The multiconductor distribution cables 16 are prefabricated with respect to length in order to accommodate the physical layout of the branch office.

Figure 4:
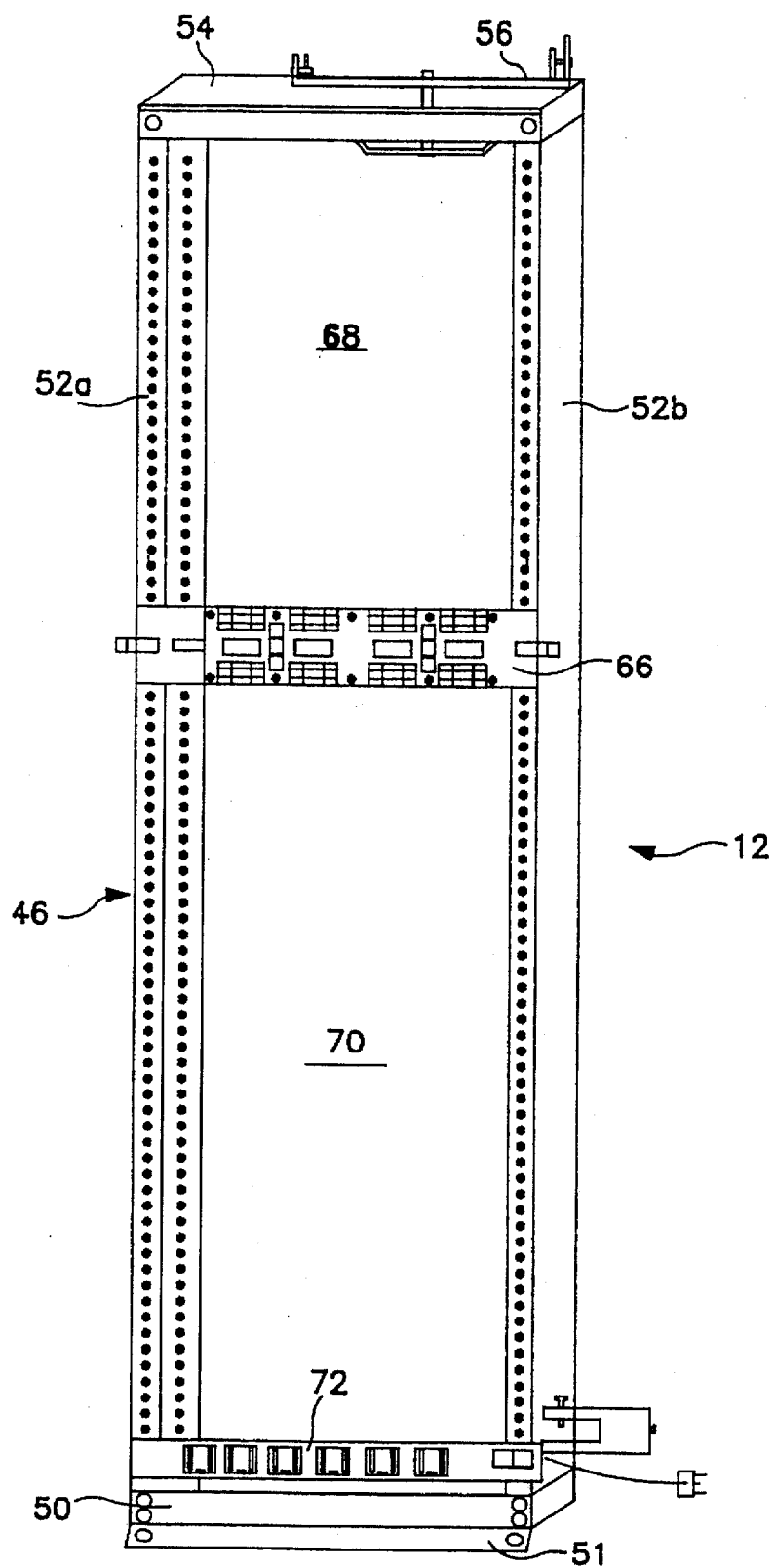
FIG. 4 is an isometric view of a vertical section of the equipment rack shown in FIG. 1, for use in a cabling system according to the present invention.

Referring back to FIG. 1, the equipment rack 12 is preferably formed in two sections, a vertical section 46 and a horizontal section 48. The vertical section 46 is constructed and arranged for supporting various items of data, communication, and interconnection equipment, and the horizontal section 48 is constructed and arranged for supporting a plurality of jumper cables 14. Shown in FIG. 4 is a preferred arrangement for vertical section 46 of equipment rack 12. A support base 50 is connected to a pair of vertical columns 52a and 52b. The support base 50 is adapted for mounting on a floor and includes a flange 51 having holes formed therein for receiving anchoring devices such as bolts or studs. The vertical columns 52a, 52b are bolted to the support base 50, although other suitable means of attachment can be used, such as welding.

A cross member 54 is connected to the other ends of columns 52a and 52b distal from the support base 50. A hinge bracket 56 is fixedly mounted on the cross member 54. A multi-port patch panel 66 is mounted on the equipment rack 12. The number of patch panels used for a given installation will depend on the number of workstations served by the local cabling system. Patch panel 66 is preferably of the type having clusters of modular jacks on one side, each cluster connected to a multiconductor cable terminal on the other side. The jumper cables 14 are prefabricated for connection to the multiconductor cable terminals on the patch panel 66. The patch panel 66 can alternatively be of the type that utilizes punch-down blocks instead of the modular jacks.

Patch panel 66 is disposed centrally on the vertical rack section 46 so as to provide space for additional equipment. For example, area 68 above the patch panel 66 is designated for electronic data equipment such as a network hub, a medium attachment unit (MAU), a data switch, a router, a bridge, a repeater, or a combination of such devices. Area 70 below the patch panel 66 is designated for voice and/or video communication equipment such as a telephone key system, WAN equipment, modems, video distribution equipment, or a combination of such devices. A power strip 72 is also mounted adjacent the base support 50 to provide a source of electric power to any rack mounted equipment that requires electric power. Vertical rack section 46 can also be configured to accommodate various other items relating to electric power distribution including power conditioning devices, uninterruptible power supplies (UPS), power surge arresters, or a combination of such devices.

The equipment rack 12 used in the cabling system according this invention is prefabricated and equipped prior to shipment to the intended work site. In this manner, the equipment racks for multiple work sites of an enterprise are identically configured according to the specification of the customer. Furthermore, the equipment installed on the racks is identically arranged according to a predefined scheme so that the installation will look the same from work site to work site.

Referring now to FIG. 5, the horizontal section 48 of equipment rack 12 includes a pair of parallel rails 58a, 58b. A plurality of rungs 60a, 60b, 60c, and 60d are connected between rails 58a and 58b in spaced relationship to one another. The rails 58a, 58b are connected at one end thereof to the hinge bracket 56. In this manner, horizontal rack section 48 can pivot relative to vertical rack section 46. Rails 58a, 58b, are equipped with respective hinges 62a and 62b to permit folding or collapsing of horizontal rack section 48. That feature simplifies handling and transportation of the equipment rack 12. A wall bracket 64 is mounted at the end of rails the horizontal rack section 48 distal from the hinge bracket 56 for anchoring the equipment rack 12 to a vertical wall.

Referring again to FIG. 1, an interconnection 73 is provided for facilitating the connection of distribution cable 16 to jumper cable 14. The interconnection 73 includes a male strain relief connector 74 which is connected to one end of distribution cable 16. A female strain relief connector 76 terminates an end of jumper cable 14. A similar strain relief terminal connector 78 is connected a the other end of distribution cable 16 to facilitate connecting the cable to the distribution outlet 18. Jumper cable 14 is terminated at its other end with an appropriate connector for connecting to the back of the patch panel 66. In the cabling system kit according to this invention, the jumper cables 14 and the distribution cables 16 are prefabricated with the appropriate strain relief connectors.

In view of the foregoing description and the accompanying drawings, the novel features and advantages of the modular cabling system according to the present invention are now apparent. A novel cabling system has been described for an enterprise having multiple work sites. Each work site has a plurality of workstations that are interconnected in a network and the novel cabling system includes a plurality of cabling kits that are prefabricated for installation. Each cabling kit includes a prefabricated equipment rack, at least one cable interconnection means mounted on said equipment rack for providing an interconnection to a centralized network device, a plurality of cable outlets, each located at one of the workstations, and a plurality of multiconductor distribution cables formed in lengths dimensioned according to the physical layout of a work site for interconnecting the cable interconnection means and the cable outlets. Except for the number and lengths of the multiconductor distribution cables, the cabling kits are configured identically for each of the work sites.

It will be readily appreciated that the present invention will greatly facilitate the installation and maintenance of network cabling systems at a plurality of remotely located sites of an enterprise because there is no discretion on arranging the local equipment on the rack or in its wiring during installation at the work site. Furthermore, because the arrangement of the rack-mounted equipment is the same from site to site, a corporate system manager can easily walk a local manager through a change or through the troubleshooting and resolution of a problem. The system eliminates the dependency on a local site installer with respect to the configuration of the rack equipment and wiring scheme. Furthermore, the prefabrication of the multiconductor cables facilitates installation at the various work sites because it eliminates the need for on-site cable termination and checking of the cables. The local installer need only pull in the cables and plug them into the appropriate connectors at the site.

It will be recognized by those skilled in the art that changes or modifications may be made to the above-described invention without departing from the broad inventive concepts of this invention. It is understood, therefore, that the invention is not limited to the particular embodiments disclosed herein, but is intended to cover all modifications and changes which are within the scope of the invention as defined in the appended claims.

What is claimed is:

1. A cabling system for an enterprise having multiple work sites, each work site having a plurality of workstations that are interconnected in a network, said cabling system comprising a plurality of cabling kits each being configured for one of said multiple work sites and comprising:

a prefabricated equipment rack;

a cable interconnection means mounted on said equipment rack for providing an interconnection to a centralized network device;

a plurality of distribution outlets, each adapted for being located at one of the workstations; and a plurality of multiconductor distribution cables formed in lengths dimensioned according to the physical layout of a work site for interconnecting said cable interconnection means and said distribution outlets;

wherein, except for the number and lengths of said multiconductor distribution cables, said cabling kits are configured essentially identically for each of said work sites.

2. A cabling system as recited in claim 1 wherein said cable interconnection means comprises a patch panel mounted on said equipment rack and a plurality of multiconductor jumper cables formed for interconnecting said patch panel and said plurality of multiconductor distribution cables.

3. A cabling system as recited in claim 1 wherein each of said multiconductor distribution cables is prefabricated with a multiconductor, strain relief connector at each end thereof.

4. A cabling system as recited in claim 3 wherein each of said multiconductor jumper cables is prefabricated with a multiconductor, strain relief connector at each end thereof.

5. A cabling system as recited in claim 1 wherein each of said distribution outlets comprises a terminal for receiving the strain relief connector on one of said multiconductor cables and a modular jack operatively connected to said terminal.

6. A cabling system as recited in claim 5 wherein each of said distribution outlets comprises two modular jacks.

7. A cabling system as recited in claim 6 wherein each of said distribution outlets comprises a plurality of modular jacks.

8. A cabling system as recited in claim 1 wherein each of said cabling kits comprises data equipment mounted on said equipment rack, said data equipment being selected from a group of devices consisting of a network hub, a medium attachment unit, a data-switch, a router, a bridge, a repeater, and a combination of any of said devices.

9. A cabling system as recited in claim 1 wherein each of said cabling kits comprises power equipment mounted on said equipment rack, said power equipment being selected from a group of power devices consisting of a power distribution strip, a power conditioning device, an uninterruptible power supply, a power surge arrestor, and a combination of any of said power devices.

10. A cabling system as recited in claim 2 wherein said equipment rack comprises a vertical rack section for supporting said patch panel and a horizontal rack section for supporting said plurality of multiconductor jumper cables.

11. A cabling system as recited in claim 10 wherein said horizontal rack section is attached to said vertical rack section in hinged relationship thereto.

12. A cabling system as recited in claim 11 wherein said horizontal rack section comprises a pair of hinged rails adapted for folding, whereby transportation and installation of said equipment rack is facilitated.

\* \* \* \* \*